No. 782,921. PATENTED FEB. 21, 1905.
A. PRENATT.
DINNER PAIL.
APPLICATION FILED OCT. 23, 1903.
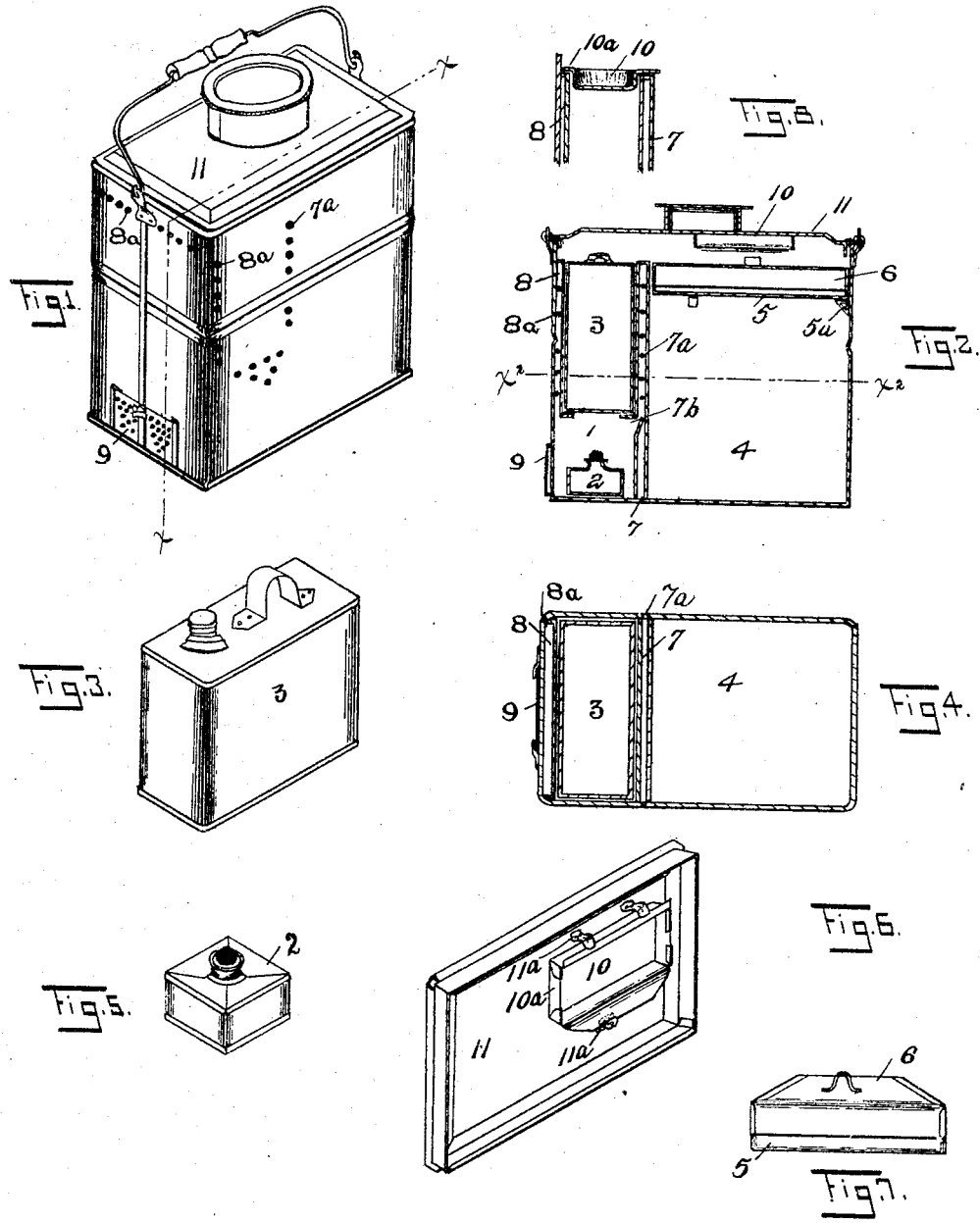
WITNESSES:
A. A. Easterly.
W. I. Cathcart.
Alexis Prenatt INVENTOR
BY
Geo. B. Willcox ATTORNEY No. 782,921. Patented February 21, 1905.

UNITED STATES PATENT OFFICE.

ALEXIS PRENATT, OF BAY CITY, MICHIGAN.

DINNER-PAIL.

SPECIFICATION forming part of Letters Patent No. 782,921, dated February 21, 1905.

Application filed October 23, 1903. Serial No. 178,293.

*To all whom it may concern:*

Be it known that I, ALEXIS PRENATT, a citizen of the United States, residing at Bay City, in the county of Bay and State of Michigan, have invented certain new and useful Improvements in Dinner-Pails; and I do hereby declare the following to be a full, clear, and exact description of the invention, such as will enable others skilled in the art to which it appertains to make and use the same.

This invention is a dinner or lunch pail; and the improvement relates more particularly to a pail construction whereby means is provided for heating tea or coffee and cooking eggs or other small articles of food and simultaneously warming the food in the other compartments of the pail without danger of overheating.

The invention also provides means for adequately ventilating the lamp-compartment to produce proper combustion and to carry off the lamp fumes without bringing them in contact with the food, thus avoiding tainting it by the odors of the wood-alcohol or other liquid fuel used in the lamp, the ventilating means being effective whether the lamp is burning or not.

The invention also contemplates a compact arrangement of the liquid and food receptacles and cooking utensils, so as to occupy the least space.

My invention is illustrated in the accompanying drawings, in which—

Figure 1 is a perspective view of a pail embodying my improvements. Fig. 2 is a vertical section on the line $x\,x$ of Fig. 1. Fig. 3 is a perspective view of the liquid-containing vessel or coffee-can. Fig. 4 is a horizontal section taken on the line $x^2\,x^2$ of Fig. 2. Fig. 5 shows the heating-lamp. Fig. 6 is a perspective view showing the under side of the pail-cover with the cooking utensil secured thereto. Fig. 7 is a front perspective view showing the upper tray and its cover. Fig. 8 is a part-sectional detail of the heating-chamber, similar to the view shown in Fig. 2, but with the cooking vessel in place instead of the coffee-can.

As is clearly shown in the drawings, the device consists in a heating-chamber 1, in the bottom of which is located any suitable form of heating device, preferably an alcohol or other liquid-fuel lamp 2. Removably inserted in the heating-chamber 1 is a liquid-receptacle 3 for coffee, tea, or other liquid. Another compartment, 4, is provided for other foods and has near its top a shallow tray 5, suitably supported on lugs $5^a$. The tray 5 has a cover 6, and the tray 5 and cover 6 together form a closed receptacle for such food as it is desired to keep separate from that in the lower part of the compartment 4. The compartments 1 and 4 are separated from each other by a hollow transverse partition 7, the interior of which communicates with the outer air by suitable openings $7^a$, made in the side of the pail. An opening or inlet $7^b$ is provided in the wall of the compartment next to the heating-chamber 1 to admit heated air from the chamber 1 to the interior of the partition 7, whence it flows out through the openings $7^a$. Similarly a hollow wall 8 is provided at the side of the pail, against which the can 3 rests, and this wall has perforations $8^a$ along its side and top, as shown in Figs. 1 and 2, so that heated air from the chamber 1 may pass into the hollow wall 8 and flow out through the openings $8^a$. A ventilating-door 9 of any suitable form is provided in the front of the pail through which to insert and regulate the lamp 2. It will thus be seen that the lamp 2, burning directly under the can 3, can heat the contents of the can rapidly, since the heat not only acts on the bottom of the can, but also passing up through the hollow walls 7 and 8 heats the sides of the can.

An important advantage of this construction is that the fumes from the lamp pass out from the pail without coming in contact with the food in the compartment 4, and a still further advantage is that while the can 3 is being heated the contents of the compartment 4 are also warmed to a moderate temperature, but cannot be overheated, because of the proportionately small amount of heat transmitted to them through the radiating effect of the wall 7.

It is sometimes desirable to not only heat liquids, but to cook small articles, such as eggs, or to heat vegetables and the like. I have provided means for doing this in the device illustrated in Figs. 6 and 8. The shallow pan, having projecting edges 10ª, is adapted to fit in the top of the heating-chamber 1 when the can 3 is removed, the flanges 10ª supporting the pan. When the pan is not in use, it may be inverted and secured to the under side of the pail-cover 11 by means of spring-catches 11ª. By inverting the pan 10, as shown, it occupies very little space in the pail.

What I claim as my invention, and desire to secure by Letters Patent, is as follows:

In a dinner-pail the combination of a vertical partition extending across said pail from side to side, the upper part of said partition being made of two parallel sheets of metal joined and forming with the sides of the pail an air-chamber, the sides of the pail being provided with perforations communicating with said air-chamber; one side of said partition being provided at its lower end with a flange; a liquid-receptacle removably located between the wall of the pail and the wall of said chamber, and resting on said flange; a lamp-chamber beneath said liquid-receptacle and communicating with said air-chamber; a removable tray supported near the top of the pail and covering the area of the pail at one side of said partition, substantially as and for the purposes set forth.

In testimony whereof I affix my signature in presence of two witnesses.

ALEXIS PRENATT.

Witnesses:
W. I. CATHCART,
A. A. EASTERLY.